US011945443B2

United States Patent
Gariepy et al.

(10) Patent No.: US 11,945,443 B2
(45) Date of Patent: Apr. 2, 2024

(54) SYSTEMS AND METHODS FOR TRACTION DETECTION AND CONTROL IN A SELF-DRIVING VEHICLE

(71) Applicant: CLEARPATH ROBOTICS INC., Kitchener (CA)

(72) Inventors: Ryan Christopher Gariepy, Kitchener (CA); Shahab Kaynama, Mountain View, CA (US)

(73) Assignee: CLEARPATH ROBOTICS INC., Kitchener (CA)

( * ) Notice: Subject to any disclaimer, the term of this patent is extended or adjusted under 35 U.S.C. 154(b) by 0 days.

(21) Appl. No.: 17/375,265

(22) Filed: Jul. 14, 2021

(65) Prior Publication Data
US 2022/0055626 A1    Feb. 24, 2022

Related U.S. Application Data

(63) Continuation of application No. 15/904,592, filed on Feb. 26, 2018, now Pat. No. 11,097,736.
(Continued)

(51) Int. Cl.
*B60W 30/18*    (2012.01)
*G01C 21/26*    (2006.01)
(Continued)

(52) U.S. Cl.
CPC ....... *B60W 30/18172* (2013.01); *G01C 21/26* (2013.01); *B60K 7/0007* (2013.01); *B60W 2420/42* (2013.01); *B60W 2420/52* (2013.01); *B60W 2520/10* (2013.01); *B60W 2520/28* (2013.01); *B60W 2710/081* (2013.01); *B60W 2720/28* (2013.01); *G05D 1/0231* (2013.01); *G05D 1/027* (2013.01); *G05D 2201/0213* (2013.01)

(58) Field of Classification Search
CPC ....... B60W 30/18172; B60W 2420/42; B60W 2520/10; B60W 2520/28; B60W 2710/081; B60W 2720/28; G01C 21/26; B60K 7/0007; G05D 1/0231; G05D 1/027; G05D 2201/0213; B60T 8/175; B60Y 2200/62
See application file for complete search history.

(56) References Cited

U.S. PATENT DOCUMENTS 5,581,250 A    12/1996  Khvilivitzky
5,700,074 A    12/1997  Sugimoto et al.
(Continued)

FOREIGN PATENT DOCUMENTS

WO    2015008380 A1    1/2015

*Primary Examiner* — Sze-Hon Kong

(57) ABSTRACT

Methods and systems are provided for traction detection and control of a self-driving vehicle. The self-driving vehicle has drive motors that drive drive-wheels according to a drive-motor speed. Traction detection and control can be obtained by measuring the vehicle speed with a sensor such as a LiDAR or video camera, and measuring the wheel speed of the drive wheels with a sensor such as a rotary encoder. The difference between the measured vehicle speed and the measured wheel speeds can be used to determine if a loss of traction has occurred in any of the wheels. If a loss of traction is detected, then a recovery strategy can be selected from a list of recovery strategies in order to reduce the effects of the loss of traction.

20 Claims, 6 Drawing Sheets

Related U.S. Application Data

(60) Provisional application No. 62/464,470, filed on Feb. 28, 2017.

(51) Int. Cl.
  *B60K 7/00* (2006.01)
  *G05D 1/00* (2006.01)

(56) References Cited

U.S. PATENT DOCUMENTS

| | | | |
|---|---|---|---|
| 5,785,281 | A | 7/1998 | Peter et al. |
| 5,806,938 | A | 9/1998 | Stumpe et al. |
| 5,983,161 | A | 11/1999 | Lemelson et al. |
| 6,405,132 | B1 | 6/2002 | Breed et al. |
| 9,102,406 | B2 | 8/2015 | Stark et al. |
| 9,141,109 | B1 | 9/2015 | Kamata |
| 9,187,088 | B1 | 11/2015 | Ferguson et al. |
| 9,442,487 | B1 | 9/2016 | Ferguson et al. |
| 9,671,791 | B1 | 6/2017 | Paczan |
| 9,779,314 | B1 | 10/2017 | Wendel et al. |
| 9,896,030 | B2 | 2/2018 | Sugimoto |
| 10,019,008 | B2 * | 7/2018 | Kong ............... B60W 30/045 |
| 10,328,942 | B2 | 6/2019 | Kelly et al. |
| 10,446,034 | B2 | 10/2019 | Akamine et al. |
| 10,909,629 | B1 | 2/2021 | Madigan et al. |
| 11,305,593 | B2 * | 4/2022 | Coombs ............... F02B 33/00 |
| 2002/0013651 | A1 | 1/2002 | Weiberle et al. |
| 2002/0137489 | A1 | 9/2002 | Dutta et al. |
| 2003/0096594 | A1 | 5/2003 | Naboulsi |
| 2004/0204803 | A1 | 10/2004 | Matsuda et al. |
| 2005/0023052 | A1 | 2/2005 | Beck et al. |
| 2007/0106473 | A1 | 5/2007 | Bodin et al. |
| 2008/0018472 | A1 | 1/2008 | Dasilva |
| 2008/0106886 | A1 | 5/2008 | Sugimoto et al. |
| 2009/0210109 | A1 | 8/2009 | Ravenscroft |
| 2009/0222134 | A1 | 9/2009 | Franke et al. |
| 2011/0015844 | A1 | 1/2011 | Perkins et al. |
| 2011/0021310 | A1 | 1/2011 | Kresse et al. |
| 2011/0210529 | A1 * | 9/2011 | Markstaller ........ B62D 53/0814 280/438.1 |
| 2012/0310466 | A1 | 12/2012 | Fairfield et al. |
| 2013/0142393 | A1 | 6/2013 | Lord et al. |
| 2013/0144480 | A1 | 6/2013 | Kobayashi et al. |
| 2013/0197760 | A1 | 8/2013 | Castaneda et al. |
| 2013/0253770 | A1 | 9/2013 | Nishikawa et al. |
| 2013/0311075 | A1 | 11/2013 | Tran et al. |
| 2014/0214255 | A1 | 7/2014 | Dolgov et al. |
| 2014/0277888 | A1 | 9/2014 | Dastoor et al. |
| 2014/0365113 | A1 | 12/2014 | McGavran et al. |
| 2015/0046034 | A1 | 2/2015 | Kikuchi |
| 2015/0161872 | A1 | 6/2015 | Beaulieu et al. |
| 2015/0239442 | A1 | 8/2015 | Yamakado et al. |
| 2015/0251658 | A1 | 9/2015 | Kato |
| 2015/0266487 | A1 | 9/2015 | Kato |
| 2015/0269860 | A1 | 9/2015 | Shaw et al. |
| 2015/0291210 | A1 | 10/2015 | Kageyama |
| 2016/0001775 | A1 | 1/2016 | Wilhelm et al. |
| 2016/0059851 | A1 * | 3/2016 | Klier ..................... B60W 50/14 701/1 |
| 2016/0068267 | A1 | 3/2016 | Liu et al. |
| 2016/0093210 | A1 * | 3/2016 | Bonhomme ......... G08G 1/0141 340/905 |
| 2016/0193999 | A1 | 7/2016 | Sasabuchi |
| 2016/0250930 | A1 | 9/2016 | Collins et al. |
| 2016/0304198 | A1 | 10/2016 | Jourdan |
| 2016/0318445 | A1 | 11/2016 | Sugimoto |
| 2017/0036771 | A1 | 2/2017 | Woodman et al. |
| 2017/0076616 | A1 | 3/2017 | Kanade et al. |
| 2017/0102241 | A1 | 4/2017 | Paduano et al. |
| 2017/0158178 | A1 | 6/2017 | Kerber et al. |
| 2017/0188510 | A1 | 7/2017 | Finecke et al. |
| 2017/0253241 | A1 * | 9/2017 | Filev ..................... B60W 30/18 |
| 2017/0355360 | A1 | 12/2017 | Reed et al. |
| 2018/0012490 | A1 * | 1/2018 | Jodorkovsky .... G08G 1/096725 |
| 2018/0162349 | A1 | 6/2018 | Chang et al. |
| 2018/0211536 | A1 | 7/2018 | Akamine et al. |
| 2018/0264950 | A1 | 9/2018 | Yokoyama et al. |
| 2018/0297585 | A1 | 10/2018 | Lian et al. |
| 2019/0079537 | A1 | 3/2019 | Yoshida et al. |
| 2019/0092347 | A1 | 3/2019 | Kim |
| 2019/0120951 | A1 | 4/2019 | Fischer |
| 2019/0202465 | A1 | 7/2019 | Kato et al. |
| 2019/0294167 | A1 * | 9/2019 | Kutila ................ G01C 21/3461 |
| 2019/0344796 | A1 | 11/2019 | Lian et al. |
| 2020/0284601 | A1 * | 9/2020 | Myers ................ G06F 16/2379 |
| 2022/0005291 | A1 * | 1/2022 | Konrardy ............... G07C 5/008 |

* cited by examiner

500

| Priority | Strategy | Score |
|---|---|---|
| 1 | Variable (increasing) acceleration | 0.73 |
| 2 | Constant acceleration | 0.90 |
| 3 | Disable "turn-in-place" | 0.47 |

FIG. 5

SYSTEMS AND METHODS FOR TRACTION DETECTION AND CONTROL IN A SELF-DRIVING VEHICLE

CROSS-REFERENCE TO RELATED APPLICATIONS

This application is a continuation of U.S. patent application Ser. No. 15/904,592 that was filed on 26 Feb. 2018 which claims priority to U.S. Provisional Patent Application No. 62/464,470 that was filed on 28 Feb. 2017, the contents of which are incorporated herein by reference.

FIELD

The described embodiments relate to vehicle dynamics and control systems of self-driving vehicles, and in particular, to detecting slippage of vehicle wheels, and responding thereto.

BACKGROUND

Vehicles that operate with drive wheels driven by a motor are prone to the drive wheel slipping. A wheel slips when there is relative motion between the contact surface of the wheel (e.g. a tire) and the surface on which the vehicle is moving. Wheel slip may occur when the surface on which the vehicle is moving is slippery (e.g. low friction), or when there is a slippery substance between the wheel and the surface on which the vehicle is moving. Wheel slip may also occur when the vehicle is carrying an unbalanced load, which distributes the mass over the vehicle's wheels so that one of the drive wheels has insufficient friction, or is out of contact with the surface entirely.

Wheel slip can be a problem for all types of vehicles. For example, automobiles can experience conditions that are dangerous to drivers, passengers, and other people using the roadway when an automobile wheel experiences slip. For vehicles with a degree of autonomy or automation, which rely on wheel odometry for navigational purposes, wheel slip can lead to navigational errors since wheel rotation does not directly correlate to locomotion of the vehicle.

SUMMARY

In a first aspect, there is a vehicle comprising at least one wheel for moving the vehicle, at least one drive motor for driving the at least one wheel with at least one drive motor speed, a computer having a processor in communication with the at least one drive motor for adjusting the at least one drive motor speed, a first sensor for measuring a vehicle speed of the vehicle, the first sensor in communication with the computer, and a second sensor for measuring a wheel speed of the at least one wheel. The processor is configured to receive the vehicle speed from the first sensor and the wheel speed from the second sensor, calculate a difference between the vehicle speed and the wheel speed, and, responsive to the loss of traction, implement a corrective action. The difference between the vehicle speed and the wheel speed is indicative of a loss of traction of the at least one wheel.

According to some embodiments, the first sensor comprises a range-finding sensor and the second sensor comprises a rotary encoder.

According to some embodiments, the range-finding sensor is a LiDAR device.

According to some embodiments, the LiDAR device is a two-dimensional LiDAR device.

According to some embodiments, the first sensor comprises at least one video camera.

According to some embodiments, the first sensor comprises an inertial-measurement unit.

According to some embodiments, the second sensor comprises a rotary encoder.

According to some embodiments, the corrective action comprises decelerating the at least one wheel at a constant deceleration.

According to some embodiments, the corrective action comprises decelerating the at least one wheel at a variable deceleration.

According to some embodiments, the at least one wheel comprises a first wheel and a second wheel, and the at least one drive motor comprises a first drive motor for driving the first wheel with a first-drive-motor speed and a second drive motor for driving the second wheel at a second drive-motor speed.

According to some embodiments, the processor is further configured to determine a ratio of the first drive-motor speed to the second drive-motor speed associated with an intended vehicle path. The corrective action comprises reducing the first drive-motor speed, and proportionately reducing the second drive motor speed such that the ratio of the first drive-motor speed to the second drive-motor speed associated with the intended vehicle path is maintained.

In a second aspect, there is a method for traction detection and control of a vehicle comprising moving the vehicle with a drive motor operating at a drive-motor speed, measuring, with the first sensor, a vehicle speed of the vehicle, measuring, with a second sensor, a wheel speed of a wheel of the vehicle, receiving, at a computer, the vehicle speed and the wheel speed, calculating, with the computer, a speed difference based on the vehicle speed and the wheel speed, and, responsive to the loss of traction, implementing a corrective action. The speed difference is indicative of a loss of traction of the wheel.

According to some embodiments, the corrective action comprises decelerating the first drive wheel to a reduced first wheel speed using at least one of the first drive motor and a first brake attached to the first drive wheel, decelerating the second drive wheel to a reduced second wheel speed using at least one of the second drive motor and a second brake attached to the second drive wheel, operating the first drive motor at a reduced first drive-motor speed associated with the reduced first wheel speed, and operating the second drive motor at a reduced second drive-motor speed associated with the reduced second wheel speed.

According to some embodiments, the reduced first wheel speed and the reduced second wheel speed are zero.

According to some embodiments, the method further comprises receiving a vehicle path at the computer. At least one of the reduced first drive-motor speed and the reduced second drive-motor speed are selected such that a ratio of the reduced first drive-motor speed to the reduced second drive-motor speed corresponds to the vehicle path.

According to some embodiments, the first drive motor is operating to drive the first drive wheel in a first wheel direction, and the second drive motor is operating to drive the second drive wheel in a second wheel direction opposite the first wheel direction so as to pivot the vehicle. The corrective action comprises selecting a corrective first wheel direction that is the same as the second wheel direction, thereby preventing the vehicle from pivoting.

In a third aspect, there is a method for reducing slippage of a vehicle wheel. The method comprises storing, on a non-transient computer-readable medium, a plurality of traction-control strategies, determining, with a processor, that a loss of traction of the vehicle wheel has occurred, selecting and implementing a first traction-control strategy from the plurality of traction-control strategies in response to the loss of traction, observing a first result associated with implementing the first traction control strategy with a sensor, and selecting an implementing a second traction-control strategy from the plurality of traction-control strategies in response to the first result.

According to some embodiments, the method further comprises observing a second result associated with implementing the second traction-control strategy with the sensor, recording the first result and the second result on the non-transient computer-readable medium, determining that a subsequent loss of traction of the vehicle wheel has occurred with the processor, and selecting an implementing either one of the first traction-control strategy and the second traction-control strategy in response to the subsequent loss of traction. Selecting either the first traction-control strategy or the second traction-control strategy is based on the recorded first result and the recorded second result.

In a fourth aspect, there is a method for correcting localization data in a self-driving vehicle. The method comprises moving the vehicle with a first drive motor operating at a first drive-motor speed and a second drive motor operating at a second drive-motor speed. The first drive motor is attached to a first drive wheel, and the second drive motor is attached to a second drive wheel. The method further comprises measuring a vehicle speed of the vehicle with a sensor, measuring a first wheel speed of the first drive wheel with a first rotary encoder, receiving the vehicle speed and the first wheel speed at a computer, calculating a speed difference based on the vehicle speed and the first wheel speed with the computer, determining a localization error based on the first wheel speed responsive to the loss of traction, and determining a location of the vehicle based on the localization error. The speed difference is indicative of a loss of traction of the first drive wheel.

BRIEF DESCRIPTION OF THE DRAWINGS

A preferred embodiment of the present invention will now be described in detail with reference to the drawings, in which:

FIG. 5 is a diagram showing an example table of a database containing various traction-control strategies according to some embodiments.

DESCRIPTION OF EXEMPLARY EMBODIMENTS

Figure 1:
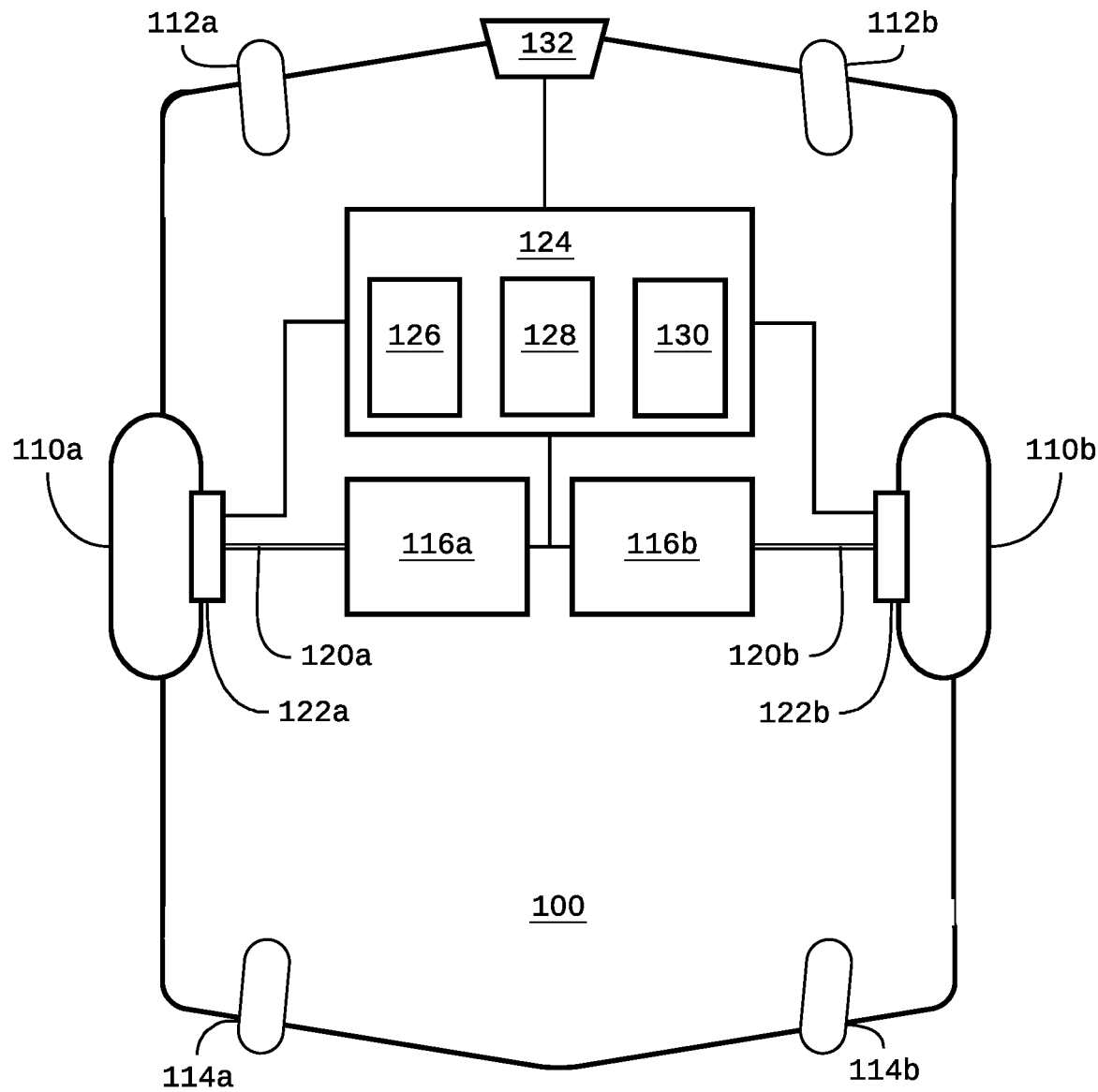
FIG. 1 is a block diagram showing vehicle systems including a system for traction detection and control according to some embodiments.

Reference is first made to FIG. 1, which depicts a vehicle 100 that includes a system for traction detection and control according to some embodiments.

The vehicle 100 includes two drive wheels 110a and 110b (collectively referred to as the drive wheel 110 or drive wheels 110) that are used to propel the vehicle 100 along a surface such as the ground, a floor, or a roadway. Other wheels may be present on the vehicle 100 as well, such as front wheels 112a and 112b (collectively 112) and rear wheels 114a and 114b (collectively 114).

According to some embodiments, the front wheels 112 and/or the rear wheels 114 may pivot in order to allow the vehicle 100 to turn. For example, the front wheels 112 and/or the rear wheels 114 may be castors. According to some embodiments, the front wheels 112 and/or the rear wheels 114 may be omni-directional wheels, or wheels of other designs that allow the front and rear of the vehicle 100 to move laterally on the wheels, thereby allowing the vehicle 100 to turn. Depending on the particular wheel configuration used, it is not necessary for the vehicle 100 to include all of the front wheels 112 or rear wheels 114 shown.

Other configurations are also contemplated, such as a configuration using four drive wheels 110, each being driven by a corresponding drive motor 116, with or without any or all of the front wheels 112 and the rear wheels 114.

The vehicle 100, as shown, includes two drive motors 116a and 116b (collectively the drive motor 116 or drive motors 116) for driving the drive wheels 110. For example, the drive motor 116a is connected to the drive wheel 110a via a drive shaft or axle 120a. Similarly, the drive motor 116b is connected to the drive wheel 110b via a drive shaft or axle 120b. The drive motors 116 may be electric motors or combustion engines.

According to some embodiments, the vehicle 100 may include brakes, which are not shown by reference in FIG. 1. For example, in the case that the drive motors 116 are electric motors, the brakes may be provided in the form of dynamic brakes (e.g. using resistive braking or regenerative braking). In the case that the drive motors 116 are combustion engine, the brakes may be mechanical brakes (not shown).

The drive wheels 110a and 110b have sensors 122a and 122b, respectively, attached, which are used to measure the rotation of the drive wheels 110 and/or the shaft 120. According to some embodiments, the sensors 122a and 122b may be rotary encoders that are capable of measuring degrees of rotation (or fractions of degrees of rotation) of the drive wheels 110a and 110b respectively. According to some embodiments, the sensors 122a and 122b may be magnetic or optical sensors that measure a full rotation of the drive wheels 110 and/or shafts 120.

The vehicle 100 also includes at least one computer 124, which is generally comprised of at least one processor 126, at least one memory 128, and at least one non-transient computer-readable medium 130. Various known computer configurations are possible, including computers with multiple processors, memories, and computer-readable media. Additionally, the computer 124 may include a transceiver (not shown in FIG. 1) for communications with a network (e.g. a wireless network). In this way, various functional and structural aspects of the computer 124 may be distributed on a computer network. According to some embodiments, the computer 124 may communicate with a fleet-management system over a wireless network.

As shown, the computer 124 is in communication with the drive motors 116 and the sensors 122. In this way, the computer 124 can control the drive motors (e.g. adjust the drive-motor speed), and also obtain information from the sensors 122 with respect to rotational displacement (and rotational velocity, acceleration, etc.) of the drive wheels 110. According to some embodiments, the computer 124 can use information obtained from the sensors 122 in order to determine the location of the vehicle 100 relative to a previously-known location. For example, based on the rotational displacement of the drive wheels 110, a rotational displacement can be determined that corresponds to the vehicle's change of location due to the rotation of the drive wheels 110. As will be appreciated, in some embodiments, the use of the sensors 122 to determine location may depend on traction between the drive wheels 110 and the ground surface.

Additionally, the vehicle 100 includes at least one sensor 132. The sensor 132 is in communication with the computer 124. Various types of sensors may be used for the sensor 132, though, generally, the sensor 132 is capable of determining at least one of distance and speed relative to other objects within the environment of the vehicle 100. For example, the sensor 132 may be a time-of-flight ranging-finding sensor, such as a LiDAR ("light detection and ranging") device, a sonar device, or radar device. In some cases, a three-dimensional LiDAR device may be used. In some cases, a two-dimensional LiDAR device may be used. According to some embodiments, when a two-dimensional LiDAR device is used, additional processing can be conducted on the LiDAR data in order to remove erroneous or irrelevant object detection, such as floor hits or other false-positive object detection. Additionally, or alternatively, the sensor 132 may measure speed relative to other objects within the environment of the vehicle 100, for example, by measuring a Doppler shift according to the Doppler effect.

According to some embodiments, the sensor 132 may be a video camera, and/or a pair of video cameras used for binocular or stereo image and range detection, or an RGB-D camera that uses a depth sensor.

According to some embodiments, the sensor 132 may comprise an inertial-measurement unit that measures any or all of the vehicle's specific force, angular rate, or surrounding magnetic field. For example, the inertial-measurement unit may include a gyroscope or accelerometers for measuring acceleration. In such a case, the vehicle's velocity can be determined by using the acceleration measured by the inertial-measurement unit.

Figure 2:
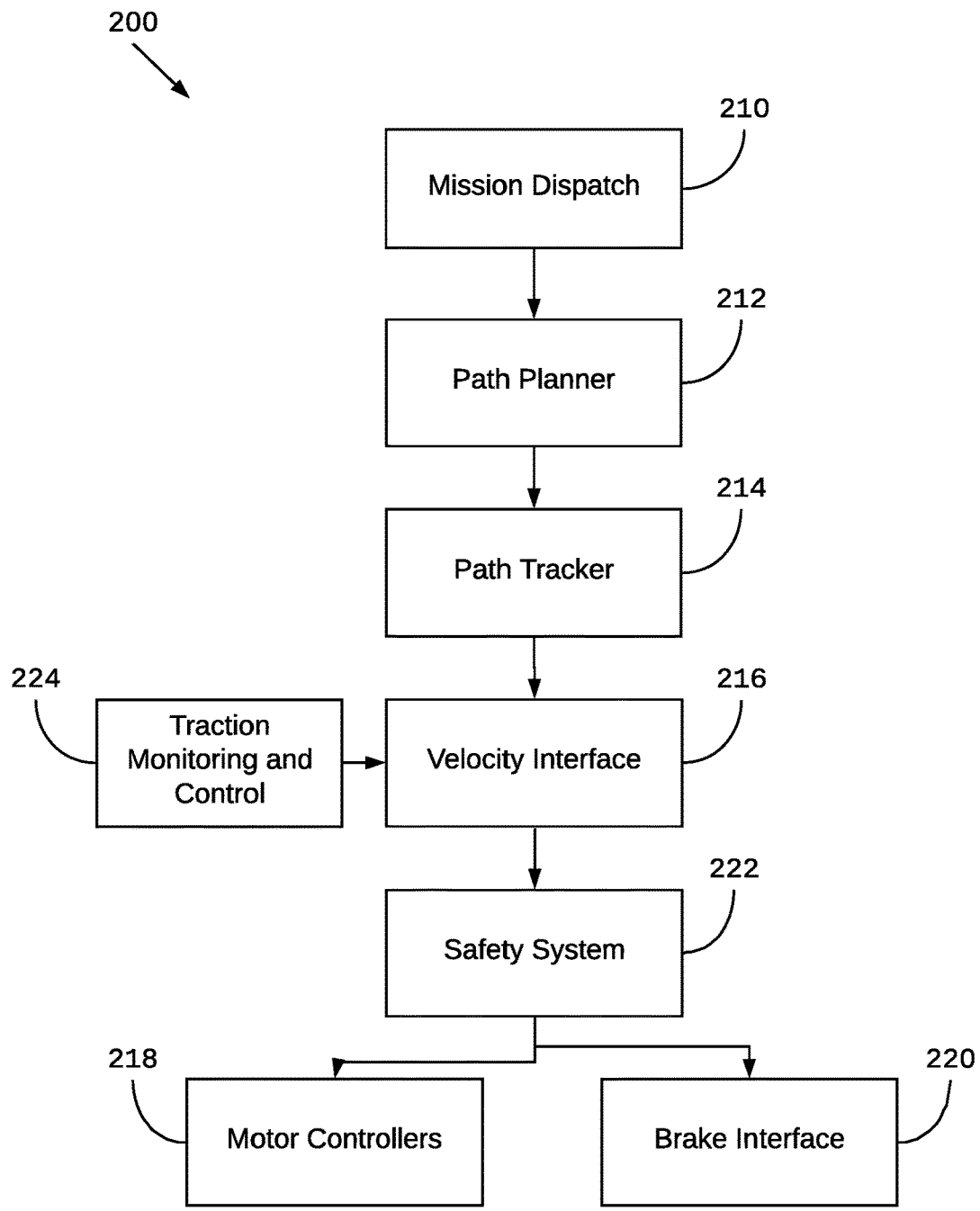
FIG. 2 is a block diagram showing a hierarchical arrangement of software layers used for traction detection and control in an autonomous or automated vehicle according to some embodiments.

Referring to FIG. 2, there are shown software layers used by a vehicle having a degree of automation or autonomy in order to implement traction detection and control. Each of the layers 212 to 222 may be implemented in software program code stored on a non-transitory computer-readable medium located on the vehicle, (e.g. the medium 130 shown in FIG. 1) that, when executed, configures a processor on the vehicle (e.g. processor 126 shown in FIG. 1) to perform the algorithms and methods pertaining to each of the layers 212 to 222. Any or all of the steps pertaining to the mission dispatch layer 210 may be stored and executed by the vehicle itself (e.g. with the computer 124 shown in FIG. 1), and/or by a server connected to the computer via a network.

The top layer 210 pertains to mission dispatch. According to some embodiments, the mission dispatch may be provided by a vehicle fleet-management system, such as may be located on a server and accessed by a vehicle over a network (e.g. using a computer such as the computer 124 shown in FIG. 1). According to some embodiments, the mission dispatch layer 210 may be provided by the vehicle itself.

The mission dispatch layer 210 provides the vehicle with a destination location. For example, a fleet-management system might provide the vehicle with a destination location pertaining to a particular mission to which the vehicle has been assigned. The destination location may be provided relative to a map representation of the vehicle's environment that is stored on a non-transient computer-readable medium on the vehicle's computer. Additionally, or alternatively, a fleet-management system may provide the vehicle with a destination location as well as an intended vehicle path to the destination from the vehicle's current location.

The path planner layer 212 provides the vehicle with a path to follow to the destination location provided by the mission dispatch layer 210. In some cases, such as when the mission dispatch layer 210 is provided by a fleet-management system, the fleet-management system may provide an intended vehicle path that can be directly used. In other cases, the path planner layer 212 may reside on the vehicle itself, such that the vehicle plans its own path based on the destination location provided. For example, the path planner layer 212 may be capable of using a map representation of the vehicle's environment, stored on the vehicle, in order to determine an intended vehicle path for the vehicle. According to some embodiments, the path planner layer 212 may continuously perform path-planning iteration, and update the vehicle with a new path, if a preferred path becomes known while the vehicle is travelling to the location destination. In any event, the path planner layer 212 makes an intended vehicle path available to the path tracker layer 214.

The path tracker layer 214 uses the intended vehicle path provided by the path planner layer 212, and compares it from input from the vehicle's sensors to determine whether the vehicle's current location has deviated from the intended vehicle path.

According to some embodiments, the path tracker 214 may receive input from the vehicle's sensors in order to detect objects that are within an unsafe proximity of the vehicle (e.g. "unsafe" based on the vehicle's current location and velocity), and then determine that a change of velocity is required in order to avoid a collision with the detected object.

The velocity interface layer 216 is responsible for controlling the velocity of the vehicle. In other words, the velocity interface layer 216 accounts for and controls the direction in which the vehicle is travelling as well as the speed at which the vehicle is travelling. The velocity interface 216 may monitor and control the vehicle's velocity based on the intended vehicle path and/or the deviations from the intended vehicle path. Furthermore, according to some embodiments, the velocity interface 216 may regulate the velocity in order to ensure that the velocity does not violate maximum speed imposed by pre-determined safety constraints. According to some embodiments, the maximum speed imposed by pre-determined safety constraints may expressed as a maximum linear speed (e.g. "absolute" speed) and/or a differential speed measured relative to two drive wheels and/or drive motors.

The velocity interface 216 controls the vehicle's velocity through the motor controllers 218. According to some embodiments, the vehicle may include multiple drive motors, with each drive motor driving its own drive wheel in order to alter or maintain the vehicle's velocity. In the example of the vehicle 100 provided in FIG. 1, the velocity interface may operate motor controllers 218 in order to affect the speed of the drive motors 116a and 116b, and thereby control both the vehicle's speed as well as the vehicle's direction (i.e. through the difference in speeds of the two drive motors 116a and 116b).

According to some embodiments, if the vehicle includes brakes, the velocity interface 216 may also control the vehicle's velocity through a brake interface 220. For example, the velocity interface 216 may use the brake interface 220 to brake the drive wheels individually or in unison in order to decelerate the drive wheels, thereby reducing the vehicle's speed and, in some cases, altering the vehicle's direction.

A safety system 222 may also be provided, which may provide input to the velocity interface 216. For example, the safety system 222 may include, or receive input from, the vehicle's sensors. In this case, if one of the vehicle's sensors detects an object within an unsafe proximity of the vehicle (e.g. "unsafe" based on the vehicle's current location and velocity), then the safety system 222 may use the motor controllers 218 and/or brake interface 220 in order to prevent the vehicle from colliding with the object, for example, by stopping the vehicle or altering the vehicle's course.

The traction monitoring and control layer 224 also provides input to the velocity interface 216. According to some embodiments, in this way, the traction monitoring and control layer 224 can override the inputs otherwise provided by the path tracker 214 and path planner 212. For example, if the velocity interface 216 is attempting to control the velocity of the vehicle in order to maintain the vehicle on the intended vehicle path, but one or more of the vehicle's wheels is slipping (i.e. experiencing a loss of traction), then, without input from the traction monitoring and control layer 224, the velocity interface 216 would not be able to account for the slipping wheel(s) and would therefore struggle to control the vehicle's velocity in order to keep the vehicle on the intended vehicle path.

In some cases, without input from the traction monitoring and control layer 224, the velocity interface 216 may in fact exacerbate the loss of traction and the vehicle's deviation from the intended vehicle path, and/or cause the vehicle to enter a state in which it could not recover from the loss of traction and return to the intended vehicle path. An example of a loss of traction and the effects on the vehicle's path (as compared to the intended vehicle path) is provided in FIG. 3.

The software layer diagram provided in FIG. 2 is provided for exemplary and descriptive purposes. It will be appreciated that various embodiments may be implemented in order to achieve similar structure and functionality by combining features from one layer into another layer. For example, various aspects of determining the vehicle's velocity and/or input parameters to the motor controllers and/or brake interface may be performed by any or all of the path tracker 214, the velocity interface 216, or the safety system 222.

Figure 3:
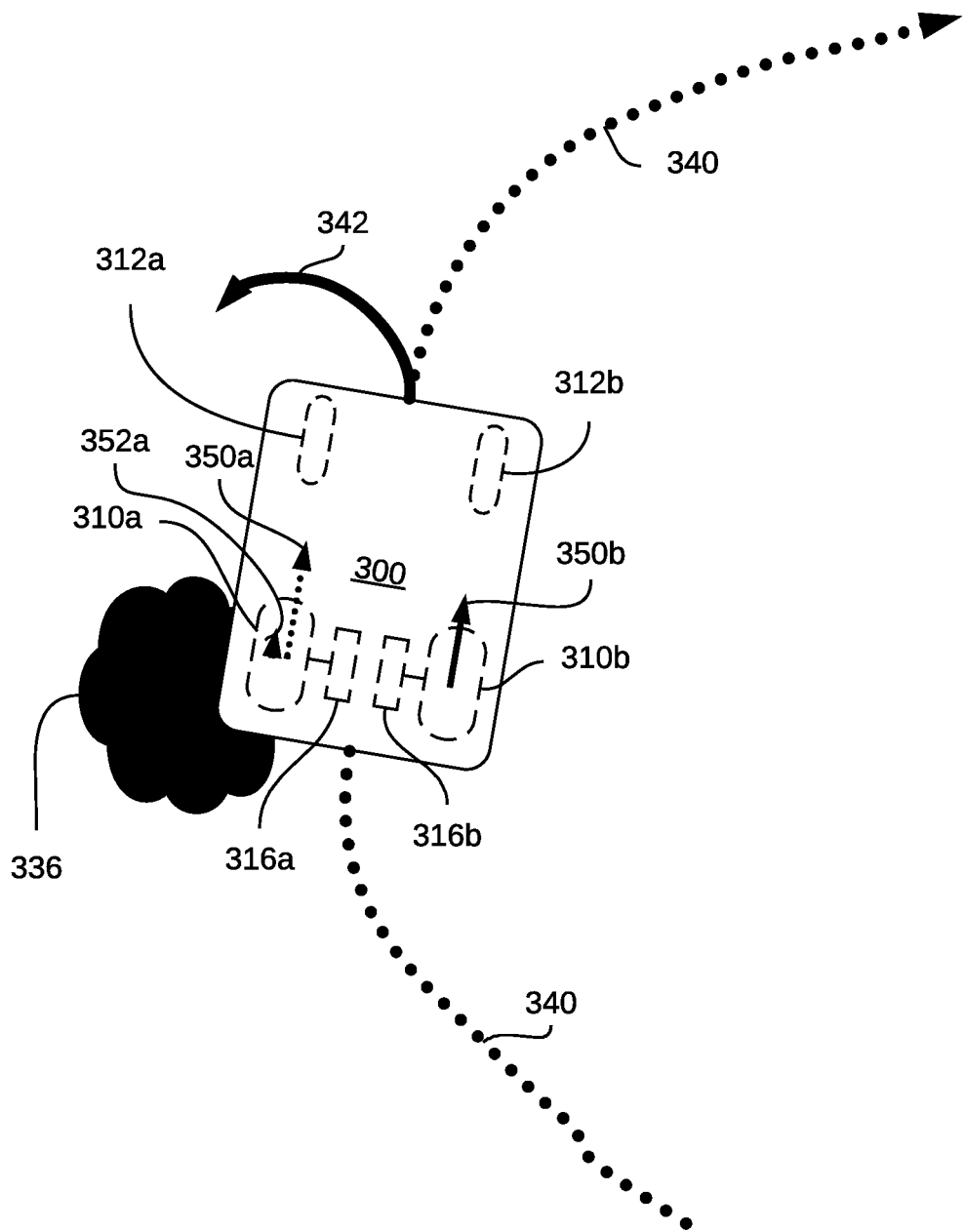
FIG. 3 is a plan view showing a vehicle experiencing an oil slick while navigating along an intended vehicle path, according to some embodiments.

Referring to FIG. 3, there is shown a vehicle 300 navigating according to an intended vehicle path 340. In order to navigate along the intended vehicle path 340, the velocity interface 216 controls the drive motors 316a and 316b via the motor controller 218. In the example shown, the front wheels 312a and 312b are omni-directional wheels that allow the vehicle to turn when there is a speed differential between the two drive wheels 310a and 310b. Based on the intended vehicle path 340, the velocity interface 216 determines that the right drive motor 316b should operate to turn the right drive wheel 310b in order to produce a linear speed (relative to the ground) as indicated by the arrow 350b, and that the left drive motor 316a should operate to turn the left drive wheel 310a in order to produce a linear speed (relative to the ground) as indicated by the dotted arrow 350a. In other words, if the left drive wheel 310a is operating with a linear speed represented by the arrow 350a and the right drive wheel 310b is operating with a linear speed represented by the arrow 350b, then the vehicle 300 should continue to follow the intended vehicle path 340, which is curving to the right as shown in FIG. 3.

However, in the example provided, the vehicle 300 has encountered an oil slick 336, which is causing the left drive wheel 310a to slip. Due to the resulting loss of traction, the actual linear speed of the left drive wheel 310a is indicated by the arrow 352a, which is significantly less than the intended linear speed.

As a result of the loss of traction, the vehicle 300 travels along an actual path 342, rather than the intended path 340. In the absence of a traction monitoring and control layer 224, the path tracker 214 may determine that the vehicle 300 needs to steer more to the right in order to stay on the intended vehicle path 340. When the input from the path tracker 214 indicates that the vehicle needs to steer more to the right, the velocity interface 216 may increase the speed of the left drive motor 316a (thus increasing the length of the arrow 350a).

However, due to the nature of the oil slick 336, the increased speed of the left drive motor 316a and the resulting increase in rotational velocity of the slipping left drive wheel 310a further exacerbates the slipping of the left drive wheel 310a.

Thus, as a result of the oil spill, the vehicle 300 may continue to drive further away from the intended path 340, thereby increasing the navigational time and effort to get the vehicle 300 back on the intended vehicle path 340 if and when traction of the left drive wheel 310a is regained. In an extreme case, the imbalance of linear speed of the right drive wheel 310b as compared to the left drive wheel 310a may cause the vehicle 300 to rotate in the oil slick 336 such that the vehicle 300 is never able to regain the intended vehicle path 340.

Referring again to FIG. 2, with input from the traction monitoring and control layer 224, the velocity interface 216 is able to account for slipping wheels. Thus, according to some embodiments, by prioritizing input from the traction monitoring and control layer 224 over input from the path tracker 214 or path planner 212, the velocity interface 216 is able to determine that the vehicle's wheels have sufficient traction before attempting to resume the vehicle's course along the intended vehicle path.

Figure 4:
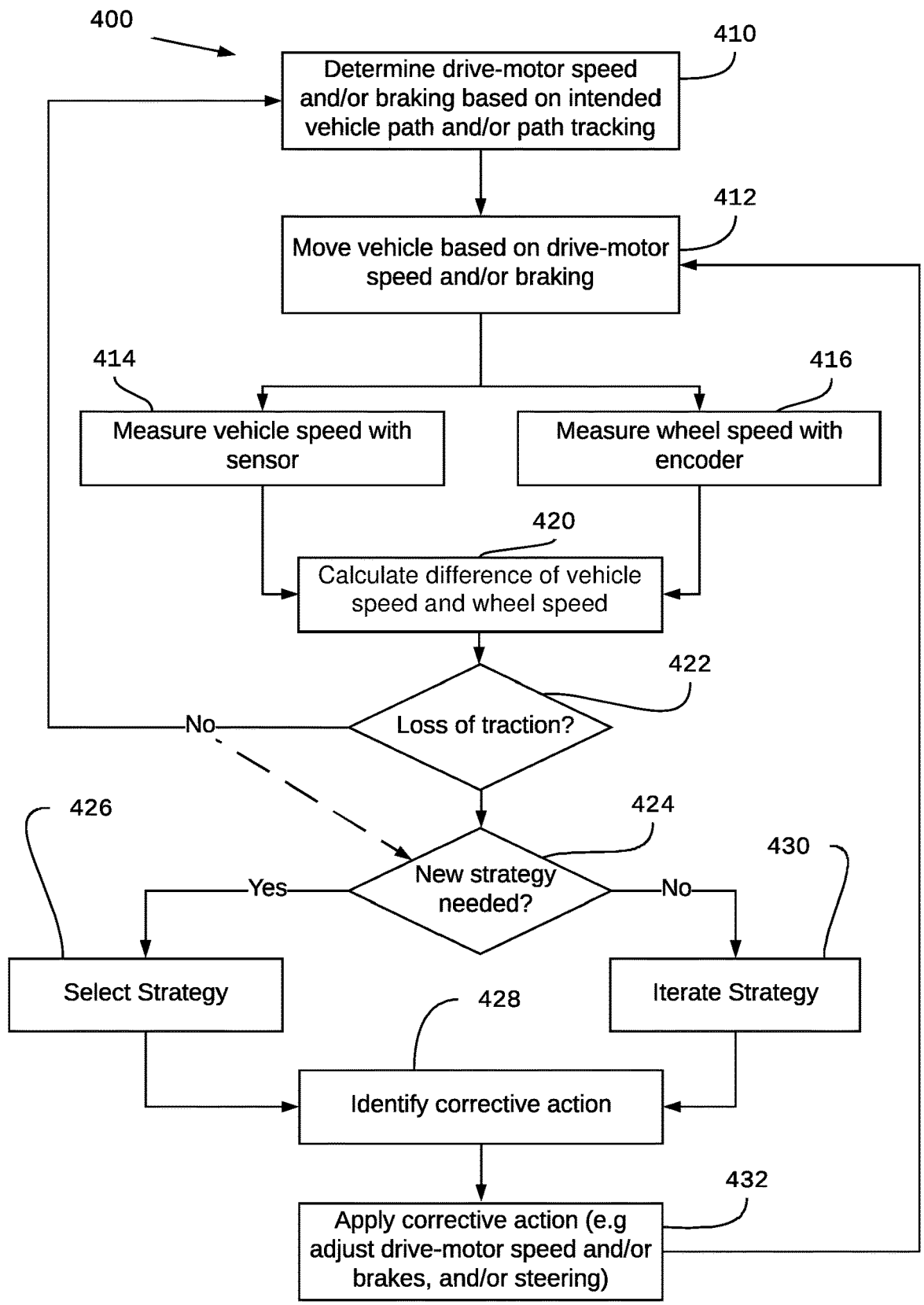
FIG. 4 is a flow diagram showing a method of traction detection and control according to some embodiments.

Referring to FIG. 4, there is shown a method 400 for traction detection and control according to some embodiments. Various steps in the method may be executed in various sequences without altering the method 400. The method may begin at various steps, for example, at step 412 or 410.

The method 400 may be executed by a computer, for example the computer 124 shown in FIG. 1, as a computer program stored in non-transient computer-readable media that, when executed, configures a processor of the computer to perform the algorithms and methods of method 400.

At step 410, an intended vehicle path and/or path-tracking data are received, for example, from the path planner 212 and/or the path tracker 214. According to some embodiments, an intended vehicle path may be provided based on the vehicle's current location, a destination location, and a map representing the vehicle's environment. The intended vehicle path may be determined by the vehicle itself, or the intended vehicle path may be provided to the vehicle from a third-party dispatch or fleet-management system. Furthermore, according to some embodiments, the vehicle may track its current location and velocity at any time, in order to determine if it has veered off the intended vehicle path, thereby generating path-tracking data.

Once the intended vehicle path and/or path-tracking data are known, then drive-wheel speeds, drive-motor speeds associated with the drive-wheel speeds, and/or braking can be determined in order to maintain the vehicle on the intended vehicle path. For example, the velocity interface 216 can determine drive-motor speeds and/or braking based on the intended vehicle path and/or path tracking data.

At step 412, the vehicle is moved according the drive-motor speeds and/or braking determined in the previous step. For example, the velocity interface 216 may utilize the motor controllers 218 and/or brake interface 220 in order to move the vehicle based on the drive-motor speeds and/or braking that was previously determined in step 410.

As the vehicle is moving, the vehicle speed and position within the map are estimated using the vehicle's sensors such as inertial-measurement units, range-finding sensors and/or optical sensors at step 414, and the wheel speed of at least one wheel is measured using other sensors such as rotary encoders. Steps 414 and 416 are shown as operating in parallel, but the steps may be executed sequentially.

According to some embodiments, the wheel speed may be measured using a magnetic or optical sensor that counts each revolution of the drive motor and/or drive wheel. In such a case, the resolution of the measurement may be confined to one revolution per sensor.

According to some embodiments, the wheel speed may be measured using a rotary encoder attached to the drive motor and/or the drive wheel. In such a case, the resolution of the measurement may be degrees or fractions of degrees.

At step 420, difference between the vehicle speed measured at step 414 and the wheel speed measured at step 416 are calculated. According to some embodiments, it may be necessary to perform some preliminary calculations in order to express the vehicle speed and the wheel speed in relatable units. For example, the wheel speed as measured (for example, using a rotary encoder) may be measured as an angular or rotational speed or velocity, and expressed in units of revolutions per minute (or second), radians (or degrees) per second. However, the vehicle speed as measured (for example, using inertial-measurement units, range-finding sensors or video cameras) may be measured as a linear speed, such as in miles per hour or meters per second. Thus, it may be necessary to calculate the linear speed of the measured rotational speed of the wheel based on the circumference of the wheel.

According to some embodiments, when the wheel speed is measured by counting the number of revolutions of the wheel or drive motor, it is necessary to wait for multiple revolutions to occur in order to obtain a measure on which the difference calculation can be based.

According to some embodiments, when the wheel speed is measured by counting individual degrees or fractions of degrees of revolution, such as with a rotary encoder, sufficient measurements on which to base the difference calculation can be obtained with less rotational displacement than an entire revolution, allowing for a loss of traction to be detected relatively quickly.

At step 422, an enquiry is made as to whether the difference between the measured vehicle speed and the measured wheel speed indicate a loss of traction. According to some embodiments, a threshold value may be stored in the computer (i.e. non-transient computer-readable medium), and the calculated difference can be compared to the threshold value. Thus, if the difference is above the threshold value, then, at step 422, it is determined that a loss of traction has occurred.

If no loss of traction has been determined at step 422, then the method returns to step 410, and the vehicle continues to navigate based on the intended vehicle path and/or path tracking.

If a loss of traction has been determined at step 422, the vehicle temporarily stops navigating according to the intended vehicle path and/or path tracking. For example, this may be accomplished when the traction monitoring and control layer 224 takes priority over the velocity interface 216 from the path planner 212 and/or path tracker 214.

According to some embodiments, at step 422, the difference between the measured vehicle speed and the measured wheel speed may be used to classify a loss of traction. For example, when the difference is between values 'a' and 'b', the loss of traction may be classified as "class 1". When the difference is between values 'b' and 'c', the loss of traction may be classified as "class 2". And so on.

The method then proceeds to step 424, at which point a determination is made as to whether a new strategy for traction control is needed. Generally, a new strategy is needed whenever no strategy has been previously selected, or a strategy that has been previously selected has been fully executed (without success). Thus, when a new loss of traction event occurs (e.g. the vehicle 300 encounters the oil slick 336), the method 400 will proceed to step 426.

At step 426, a new traction control strategy is selected that is intended to prevent the vehicle from continuing to slip and/or further deviate from the intended vehicle path. Examples of strategies available to the vehicle are provided in a table 500 shown in FIG. 5. The example strategies are: decelerate/accelerate (increasing); decelerate/accelerate (constant); and disable "turn-in-place" vehicle rotation.

In the event that a loss of traction was classified during step 422 (i.e. not merely considered a binary "yes/no" decision as to traction), then the classification determined during step 422 may be used to inform the strategy selection process.

According to some embodiments, the "decelerate/accelerate (increasing)" strategy may be used to slow down the vehicle with a deceleration that is increasing over time, until traction is regained, and then increase the vehicle's speed with an acceleration that is increasing over time so long as traction is maintained, and within the constraints imposed by the velocity interface according to the path tracker (and/or constraints imposed by the safety system).

According to some embodiments, the "decelerate/accelerate (constant)" strategy may be used to slow down the vehicle with a constant deceleration in a relatively safe manner, until traction is regained, and then increase the vehicle's speed with a constant acceleration so long as traction is maintained, and within the constraints imposed by the velocity interface according to the path tracker (and/or constraints imposed by the safety system).

Each of the decelerate/accelerate strategies may be implemented while still attempting to maintain the vehicle on the intended vehicle path. Under normal operation, when the velocity interface 216 is operating based on input from the path planner 212 and/or the path tracker 214, the velocity interface 216 may determine an appropriate speed for each of the vehicle's drive wheels in order to maintain the vehicle on the intended vehicle path, and, in some embodiments, to ensure that the velocity does not violate maximum speed imposed by pre-determined safety constraints. For example, in order to turn the vehicle along an arced path, a ratio of speeds of the drive wheels can be determined in order to achieve the intended arced path. When a loss of traction is detected, and the traction monitoring and control layer 224 takes priority over the velocity interface 216, it may reduce the speeds of the drive wheels to avoid slipping, while simultaneously determining the reduced speeds of the drive wheels in order to ensure that the same ratio of drive-wheel speeds was maintained in order to maintain the vehicle on the intended vehicle path.

According to some embodiments, the "disable 'turn-in-place'" strategy may be used to prevent the vehicle from pivoting ("turning in place"). For example, under normal conditions, the vehicle may be able to turn in place by driving the drive wheels on opposite sides of the vehicle in opposite directions, or by locking the drive wheel(s) on one side of the vehicle while driving the drive wheel(s) on the other side of the vehicle. However, in certain situations when a loss of traction is experienced, it may be preferable to avoid turning the vehicle in place. For example, if the vehicle is experiencing an imbalanced load that is reducing traction on one of the drive wheels, it may be detrimental to attempt to turn in place, because a sudden pivot may upset the load, and/or distributing the load onto a single drive wheel may damage the associated drive motor. When it is determined that "turn-in-place" should be avoided due to a loss of traction, then the "disable 'turn-in-place'" strategy can be used so that the vehicle turns by making a series of arcs (e.g. a multi-point turn) rather than pivoting. This can be accomplished, for example, by ensuring the drive motors are not operating in opposite directions.

A particular strategy may be selected at step 426 using various algorithms. According to some embodiments, the strategies (e.g. as shown in the table 500) may be assigned a priority (e.g. 1—variable acceleration; 2—constant acceleration; 3—disable "turn-in-place"), and the method 400 may iterate through each strategy in order of priority until a satisfactory result is obtained. According to some embodiments, the method may iterate a predetermined number of times on a particular strategy before trying the next strategy.

For example, the method 400 may proceed through step 426 by selecting the "variable acceleration" strategy, and then may continue to loop through the method 400 via step 424 and step 430 until the "variable acceleration" strategy has been used ten times without the method returning to step 410 through step 422. After the "variable acceleration" strategy has been used ten times without the method 400 returning to step 410 through step 422, the method 400 may proceed to step 426 through step 424 by selecting the "constant acceleration" strategy; and so on. The example of ten is used here, but any count may be used.

After each iteration through step 430, or after a new strategy has been selected at step 426, the method proceeds to step 428, where a corrective action is identified as a part of the selected strategy. For example, if the selected strategy is "variable acceleration", then, at each iteration through step 430, a new corrective action would be identified based on varying the acceleration (e.g. incrementing the acceleration to a higher or level than the previous iteration).

According to some environments, the strategies may be scored (e.g. constant acceleration—0.90; variable acceleration—0.73; disable "turn-in-place"—0.47), and the method 400 may select a strategy based on its score. The score generally relates to the estimated or calculated likelihood of success of a particular strategy, or the preference of one strategy over another.

According to some embodiments, the score for a particular strategy may be accrued or calculated over time based on observed results from a previous occurrence of that strategy. For example, when a particular strategy is executed, the results can be observed through the vehicle's sensors, and the vehicle's computer can use these observations in order to determine an associated score for that particular instance. Over time the scores from multiple instances of the same strategy can be used to calculate a single score for the strategy, such as the score shown in the table 500.

Observations made using the vehicle's sensors may include using the path tracker to determine how far the vehicle has deviated from the intended vehicle path since the loss of traction began and/or the time taken to recover to the intended vehicle path, using a rotary encoder (or other sensor) and computer to measure the time taken for the measured wheel speed to be reduced (e.g. by a pre-determined quantity or ratio) and/or the measured difference between the wheel speed of two different drive wheels, and using the computer to count the number of iterations of the strategy.

As observations are made after the strategies have been tried, and scores for the strategies have been accrued or calculated over time, then, at step 426, a preferred strategy may be identified based on its score relative to the scores for other strategies.

Furthermore, both the priority-based selection and the score-based selection may be done based on the particular conditions experienced by the vehicle.

According to some embodiments, the conditions experienced by the vehicle may be observed and recorded by an external system and/or a human operator. For example, a person may observe a water puddle, oil slick, uneven ground, a physical barrier such as an extension cord or pipe on the ground, loose debris on the floor (e.g. sand, gravel), or other conditions that may cause a vehicle to lose traction. Similarly, environmental conditions such as temperature and humidity may be automatically measured by other systems. In these cases, the conditions may be input (e.g. manually or automatically) into a map or map data that are stored on the vehicle or otherwise accessible to the vehicle.

According to some embodiments, the conditions experienced by the vehicle may be observed and recorded by the vehicle itself. For example, a vehicle may include load cells that can determine the mass and/or mass distribution of a load carried by the vehicle, and the vehicle may use its sensors to determine when it is in proximity of particular landmarks. In some cases, the optical sensors may be used to identify particular types of conditions. For example, an optical sensor such as a video camera may capture an image of loose debris on the floor, then compare the image to a template image known to be an image of sand, and then, based on the comparison, conclude that there is sand on the floor in a particular location. According to some embodiments, optical sensors may be used to determine when certain conditions exist, for example, by associating optical reflection and refraction with coefficients of friction (e.g. if there is a shiny spot on the floor ahead of the vehicle, the vehicle may have an indication that the shiny spot is also slippery).

Depending on the type of condition experienced by the vehicle, the condition may be associated with a particular time (or time of day) and/or a particular location within the environment (e.g. as determined in relation to a map of the environment).

According to some embodiments, a condition or a loss-of-traction event can be associated with a particular time (or time of day) and/or a particular location, and this association can be used to inform subsequent path planning for the vehicle, or for other vehicles via a fleet-management system. For example, if a vehicle detects a loss of traction at a particular location, then the location can be shared with other vehicles (e.g. via the fleet-management system) in so that the vehicles can plan paths that avoid the location known to be associated with a loss of traction. This may be accomplished, for example, by adding the location to a map of the environment stored on the vehicle. In some cases, the association of a known condition or loss-of-traction event with a location may exist for a pre-determined duration. For example, if a location associated with a loss of traction is added to a map, the location may expire (i.e. be removed from the map) after a particular time, such as six hours, based on the assumption that the condition associated with the loss-of-traction has been rectified.

In some cases, the location associated with the condition or loss-of-traction event can be shared with human operators so that the condition can be rectified. For example, a human operator may be notified that a vehicle has slipped at a particular location, and the human operator can then investigate the location in order to determine if there is a spill that needs to be cleaned up, or an object that needs to be removed in order to prevent further slippage. This information can be shared with the human operator via the fleet-management system, or other computer system with which both the vehicles and the human operator can communicate.

According to some embodiments, for example, as may be used in a facility with multiple known types of vehicles, a determination can be made as to how likely other vehicles may be to lose traction due to an observed condition. For example, based on the nature and characteristics of the observed condition and/or the loss of traction of a vehicle, an estimate can be made as to how the condition would affect other types of vehicles.

Based on the observed conditions associated with losses of traction, individual priorities and/or scores can be assigned for each combination of strategy and condition. For example, the "constant acceleration" strategy may be known to work better (i.e. it may obtain a higher score) than the "disable 'turn-in-place'" strategy in association with oil slicks on the floor, but the "disable 'turn-in-place'" strategy may have a higher priority or score in association with an imbalanced vehicle load condition.

In the case that priorities and/or scores are associated for a combination of strategies and conditions, then, at step 426, a particular strategy may be selected based on the conditions observed by the vehicle, and/or known locations (or times, temperatures, etc.) associated with previously-observed conditions.

Once a corrective action has been selected at step 426 and a corrective action has been identified at step 428 (e.g. for a particular iteration of the strategy), then, at step 432, the corrective action is applied. For example, the corrective action may include adjustments to the drive-motor speed and/or brakes, as previously described. These adjustments may be be made to the drive-motor speeds and/or brakes, and the method made return to 412 such that the vehicle moves based on the adjusted drive-motor speeds and/or braking. The method 400 may iterate as many times as necessary through steps 424 to 432 until no loss of traction is detected at step 422, at which point, the method 400 will return to step 410, and the vehicle will return to navigating based on the intended vehicle path and/or path tracking. For example, this may mean that the traction monitoring and control layer 224 returns priority over the velocity interface 216 to the path planner 212 and/or path tracker 214.

As indicated by the dashed line in FIG. 4, according to some embodiments, strategies may be implemented in more than one stage, and transitioning from one stage to another may depend on whether a loss of traction is still being experienced. In a sense, such strategies may be thought of as comprising two individual strategies; but the nomenclature of one strategy or two strategies in this case is merely nominal. In other words, in some cases, strategies may be implemented (i.e. priority maintained for the traction detection and control layer over the path tracker and/or velocity interface) even after traction has been restored.

For example, a strategy may comprise decelerating (e.g. at a constant or variable deceleration) until traction is restored, and then accelerating (e.g. at a constant or variable acceleration) for a pre-determined duration. In this case, the vehicle may decelerate in order to regain traction, and then drive away from the location where the loss of traction occurred in such a manner as to reduce the likelihood of experiencing a loss of traction.

For example, when a loss of traction is determined at step 422, then, during the first pass through step 424, the method may proceed to step 426 and select a strategy of "constant deceleration" (or "variable deceleration"). Subsequently, the method may return through steps 412 to 424 and iterate through step 430 by decelerating the vehicle according to the strategy. However, at some point during the course of the method 400, if no loss of traction is determined at step 422 (i.e. traction has been restored), the method may still proceed to step 424 along the dashed line. In this case, the first time through step 422 after no loss of traction was determined (i.e. when traction had been restored), the method may proceed through step 426, and the strategy of "constant acceleration" (or "variable acceleration") may be selected. Subsequently, the method may loop through step 430 for a pre-determined number of iterations or time, until the vehicle has safely moved away from the location of the known loss of traction, before the method returns to step 410 and the priority is restored to the path tracker and/or velocity interface for vehicle control. If, however, during an acceleration strategy implemented after traction was regained, a subsequent loss of traction was determined at step 422, then the method may proceed to step 426 and select a deceleration strategy until traction is restored.

Figure 6:
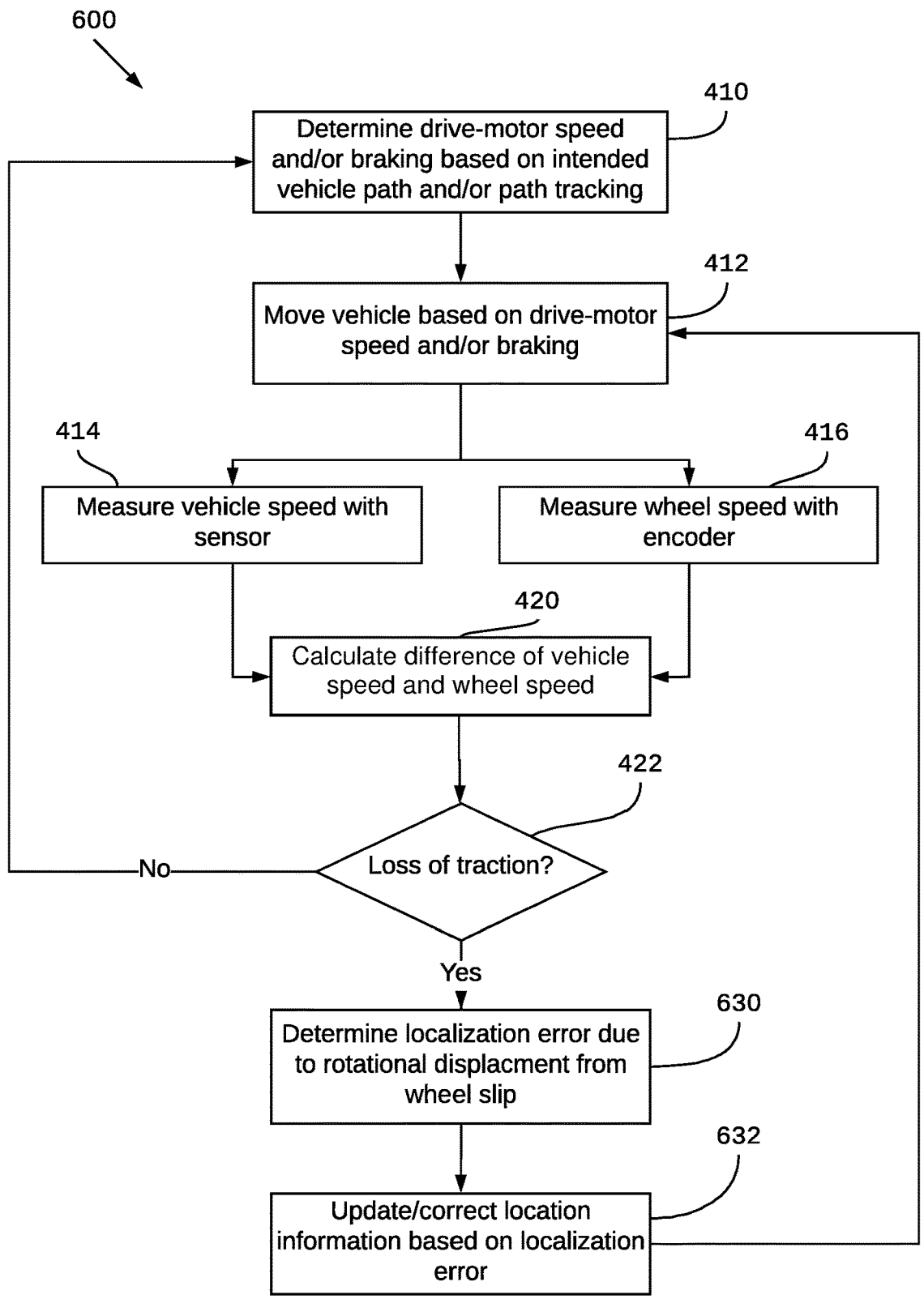
FIG. 6 is a flow diagram showing a method of correcting erroneous localization data according to some embodiments.

Referring to FIG. 6, there is shown a method 600 of correcting erroneous localization data, according to some embodiments. Various steps in the method may be executed in various sequences without altering the method 600. The method may begin at various steps, for example, at step 412 or 410.

The method 600 may be executed by a computer, for example the computer 124 shown in FIG. 1, as a computer program stored in non-transient computer-readable media that, when executed, configures a processor of the computer to perform the algorithms and methods of method 600.

The method 600 generally proceeds in accordance with the steps 410 to 422 of the method 400 shown in FIG. 4, as previously described. At step 422, when a loss of traction is detected, the method 600 proceeds to step 630.

At step 630, a localization error due to rotational displacement from wheel slip can be determined. As previously described, according to some embodiments, information obtained from rotary encoders or other similar sensors (e.g. the sensors 122) can be used to determine a vehicle's position, for example, relative to a previously-known position. This is accomplished by measuring the rotational displacement of the vehicle's wheels, and then determining a corresponding linear displacement of the vehicle. However, in some cases, if a wheel is slipping, then the corresponding linear displacement is determined by the rotational displacement and the wheel slip. In other words, rotational displacement due to wheel slip (i.e. loss of traction) can create a localization error if the wheel slip is not taken into account.

At step 632, the location of the vehicle can be determined by determining a linear displacement of the vehicle based on the rotational displacement of the wheels, taking into account (e.g. subtracting) the rotational displacement of the wheels that occurred while there was a loss of traction (i.e. the localization error).

According to some embodiments, the method 600 may be used in parallel or serial with the method 400. According to some embodiments, a single method may be used that incorporates both the method 400 and the method 600, for example, by executing the steps 630 and 632 in parallel or serial with the steps 428 and 432.

The present invention has been described here by way of example only. Various modification and variations may be made to these exemplary embodiments without departing from the spirit and scope of the invention, which is limited only by the appended claims.

We claim:

1. A vehicle comprising:
   at least one wheel for moving the vehicle;
   at least one drive motor for driving the at least one wheel; and
   a processor in communication with the at least one drive motor, the processor configured to:
      control the at least one drive motor to move the vehicle along a path within an environment;
      determine that, at a pre-determined time in the future, the vehicle will experience a condition associated with traction loss along the path;
      evaluate the condition to determine a nature of the traction loss for the vehicle;
      based on the nature of the traction loss and the vehicle:
         determine one or more priorities for minimizing traction loss at the pre-determined time; and
         select at least one traction-control strategy to address the one or more priorities from one or more traction-control strategies, wherein each traction-control strategy is assigned a score generated based on one or more previous applications of that traction-control strategy for the nature of the traction loss and the vehicle; and
      at the pre-determined time:
         implement a corrective action in accordance with the at least one traction-control strategy,
         continue to evaluate a result of the corrective action; and
         in response to determining the corrective action is ineffective, continue to determine a current priority for minimizing traction loss and to select a current traction-control strategy to address the current priority.

2. The vehicle of claim 1, wherein:
   the condition is associated with a location along the path; and
   determining that the vehicle will experience the condition comprises determining, that at the pre-determined time, the vehicle is expected to navigate through the location.

3. The vehicle of claim 2, wherein the vehicle further comprises at least one memory coupled to the processor, the at least one memory storing a map of the environment, the map including information about the location and the associated condition, and determining the location and condition is based on the information included in the map.

4. The vehicle of claim 3, wherein the information in the map is based on previous traction-loss events experienced by other vehicles at the location.

5. The vehicle of claim 2, wherein the vehicle comprises one or more sensors, and the processor is configured to identify the condition at the location based on sensor data received from the one or more sensors.

6. The vehicle of claim 5, wherein the processor is configured to:
   receive, from the one or more sensor, sensor data associated with the location;
   compare the sensor data to pre-stored sensor data associated with a known condition causing traction loss;
   determine a match between the sensor data and the pre-stored sensor data; and
   in response to determining the match, determine that the location is associated with the condition causing traction loss.

7. The vehicle of claim 2, wherein the processor is further configured to generate a notification about the condition and the location to allow a human operator to rectify the condition at the location.

8. The vehicle of claim 2, wherein the processor is further configured to determine a new path that avoids the location.

9. The vehicle of claim 1, wherein the pre-determined time in the future corresponds to a time of day when the condition is expected to occur.

10. The vehicle of claim 1, wherein the score associated with the one or more traction-control strategies is further based on an estimate of how the condition would affect the vehicle.

11. A method for traction detection and control of a vehicle comprising:
   controlling, via a processor, at least one drive motor of the vehicle to move the vehicle along a path within an environment, the at least one drive motor being configured to drive at least one wheel of the vehicle;
   determining, by the processor, that at a pre-determined time in the future, the vehicle will experience a condition associated with traction loss along the path;
   evaluating, by the processor, the condition to determine a nature of the traction loss for the vehicle;
   based on the nature of the traction loss and the vehicle:
      determining, by the processor, one or more priorities for minimizing traction loss at the pre-determined time; and
      selecting, by the processor, at least one traction-control strategy to address the one or more priorities from one or more traction-control strategies, wherein each traction-control strategy is assigned a score generated based on one or more previous applications of that traction-control strategy for the nature of the traction loss and the vehicle; and
   at the pre-determined time:
      implementing, by the processor, a corrective action in accordance with the at least one traction-control strategy;
      continue to evaluate a result of the corrective action; and
      in response to determining the corrective action is ineffective, continuing to determine a current priority for minimizing traction loss and to select a current traction-control strategy to address the current priority.

12. The method of claim 11, wherein:
the condition is associated with a location along the path; and
determining that the vehicle will experience the condition comprises determining, by the processor, that at the pre-determined time, the vehicle is expected to navigate through the location.

13. The method of claim 12, further comprising:
accessing, by the processor, a map of the environment, the map being stored on at least one memory of the vehicle coupled to the processor, wherein the map includes information about the location and the associated condition, and
determining, by the processor, the location and associated condition based on the information included in the map.

14. The method of claim 13, wherein the information in the map is based on previous traction-loss events experienced by other vehicles at the location.

15. The method of claim 12, wherein:
the vehicle comprises one or more sensors, and
the method further comprises identifying, by the processor, the condition at the location based on sensor data received from the one or more sensors.

16. The method of claim 15, further comprising
receiving, by the processor from the one or more sensor, sensor data associated with the location;
comparing, by the processor, the sensor data to pre-stored sensor data associated with a known condition causing traction loss;
determining, by the processor, a match between the sensor data and the pre-stored sensor data; and
in response to determining the match, determining, by the processor, that the location is associated the condition causing traction loss.

17. The method of claim 12, further comprising generating, by the processor, a notification about the condition and the location to allow a human operator to rectify the condition at the location.

18. The method of claim 12, further comprising determining, by the processor, a new path that avoids the location.

19. The method of claim 11, wherein the pre-determined time in the future corresponds to a time of day when the condition is expected to occur.

20. The method of claim 11, wherein the score associated with the one or more traction-control strategies is further based on an estimate of how the condition would affect the vehicle.

* * * * *